(12) United States Patent
Aragaki et al.

(10) Patent No.: US 8,391,635 B2
(45) Date of Patent: Mar. 5, 2013

(54) NOISE REMOVAL DEVICE, NOISE REMOVAL METHOD, AND COMPUTER READABLE RECORDING MEDIUM

(75) Inventors: Hideya Aragaki, Hino (JP); Takahiro Saito, Yokohama (JP); Takashi Komatsu, Yokohama (JP)

(73) Assignees: Olympus Corporation, Tokyo (JP); Kanagawa University, Yokohama-Shi (JP)

( * ) Notice: Subject to any disclaimer, the term of this patent is extended or adjusted under 35 U.S.C. 154(b) by 984 days.

(21) Appl. No.: 12/200,243

(22) Filed: Aug. 28, 2008

(65) Prior Publication Data

US 2009/0060323 A1    Mar. 5, 2009

(30) Foreign Application Priority Data

Aug. 31, 2007 (JP) ................. 2007-225840

(51) Int. Cl.
*G06K 9/40* (2006.01)
(52) U.S. Cl. ............ 382/275; 382/164; 348/625
(58) Field of Classification Search .......... 382/164, 382/173
See application file for complete search history.

(56) References Cited

U.S. PATENT DOCUMENTS

| | | | | |
|---|---|---|---|---|
| 3,789,133 A * | 1/1974 | Kline | ............ | 348/627 |
| 4,621,290 A * | 11/1986 | Fling | ............ | 348/625 |
| 4,812,903 A * | 3/1989 | Wagensonner et al. | ....... | 358/521 |
| 5,526,446 A * | 6/1996 | Adelson et al. | ............ | 382/275 |
| 6,115,071 A * | 9/2000 | Hurst et al. | ............ | 375/240.12 |
| 6,285,710 B1 * | 9/2001 | Hurst et al. | ............ | 375/240.12 |
| 6,445,831 B1 * | 9/2002 | Arai | ............ | 382/254 |
| 7,012,719 B1 * | 3/2006 | Takahashi | ............ | 358/474 |
| 7,095,902 B2 * | 8/2006 | Izume et al. | ............ | 382/266 |
| 7,110,044 B2 * | 9/2006 | Wang et al. | ............ | 348/627 |
| 7,116,358 B1 * | 10/2006 | Sasaki | ............ | 348/222.1 |
| 7,308,152 B2 * | 12/2007 | Ito | ............ | 382/260 |
| 7,599,572 B2 * | 10/2009 | Shekter | ............ | 382/272 |
| 8,031,956 B2 * | 10/2011 | Ali | ............ | 382/240 |
| 2002/0021827 A1 * | 2/2002 | Smith | ............ | 382/124 |
| 2002/0034337 A1 * | 3/2002 | Shekter | ............ | 382/275 |
| 2004/0252907 A1 * | 12/2004 | Ito | ............ | 382/260 |
| 2005/0012866 A1 * | 1/2005 | Chiang et al. | ............ | 348/625 |
| 2006/0279660 A1 * | 12/2006 | Ali | ............ | 348/625 |
| 2007/0036458 A1 * | 2/2007 | Sato | ............ | 382/275 |
| 2007/0036459 A1 * | 2/2007 | Sato | ............ | 382/275 |
| 2007/0172118 A1 * | 7/2007 | Pan | ............ | 382/162 |
| 2009/0059077 A1 * | 3/2009 | Cha | ............ | 348/627 |
| 2009/0060323 A1 * | 3/2009 | Aragaki et al. | ............ | 382/164 |
| 2009/0226087 A1 * | 9/2009 | Aragaki et al. | ............ | 382/167 |
| 2010/0027885 A1 * | 2/2010 | Aragaki et al. | ............ | 382/167 |
| 2010/0188582 A1 * | 7/2010 | Hsu | ............ | 348/607 |
| 2012/0212653 A1 * | 8/2012 | Kanemitsu et al. | ............ | 348/242 |

FOREIGN PATENT DOCUMENTS

JP          09-212623 A    8/1997

* cited by examiner

*Primary Examiner* — Matthew Bella
*Assistant Examiner* — Gandhi Thirugnanam
(74) *Attorney, Agent, or Firm* — Holtz, Holtz, Goodman & Chick, PC

(57) ABSTRACT

A noise removal device that removes noise from an image signal includes: a separation unit that separates the image signal into at least two subband signals; a parameter setting unit that sets a plurality of coring ranges in relation to at least one of the subband signals; and a coring unit that performs coring processing on the basis of the plurality of coring ranges.

11 Claims, 8 Drawing Sheets

WHEN SIGNS OF Hr AND Hb MATCH, AND Hr > 0, Hb > 0, Hr > Hb

WHEN SIGNS OF Hr AND Hb DO NOT MATCH, AND Hr > 0, Hb < 0, |Hr| > |Hb|

NOISE REMOVAL DEVICE, NOISE REMOVAL METHOD, AND COMPUTER READABLE RECORDING MEDIUM

TECHNICAL FIELD OF THE INVENTION

This invention relates to a technique of removing noise from an image.

BACKGROUND OF THE INVENTION

A noise removal method employing multiresolution transform is widely used in a noise removal device that removes noise signals included in an image signal. In multiresolution transform, an image signal is divided into signals in a plurality of subbands using a filter bank or a Laplacian pyramid method, and therefore noise removal processing can be performed at an intensity suited to each of the divided bands during noise removal.

JP9-212623A discloses noise reduction processing employing a wavelet transform as a multiresolution transform method. Here, the wavelet transform is implemented on source image data to obtain a plurality of subbands components, whereupon noise reduction processing is implemented by performing coring processing on each subband component. The subband components after the coring processing are then resynthesized through an inverse wavelet transform, and as a result, noise reduction-processed image data are obtained.

SUMMARY OF THE INVENTION

During coring of the subband components in JP9-212623A, a signal value is forcibly set at zero when an absolute value thereof falls to or below a predetermined threshold. This method relates to a luminance signal such as a radiation image or the like, and when applied to a color signal, processing is applied to each color signal independently. Therefore, the correlativity of each color signal is not taken into account, and when the correlation collapses due to the coring, an unnatural artifact such as a false color occurs easily on an edge portion.

According to an aspect of this invention, a noise removal device that removes noise from an image signal comprises: a separation unit that separates the image signal into at least two subband signals; a parameter setting unit that sets a plurality of coring ranges in relation to at least one of the subband signals; and a coring unit that performs coring processing on the basis of the plurality of coring ranges.

According to another aspect of this invention, a noise removal method for removing noise from an image signal, comprising: a separation step for separating the image signal into at least two subband signals; a parameter setting step for setting a plurality of coring ranges in relation to at least one of the subband signals; and a coring step for performing coring processing on the basis of the plurality of coring ranges.

According to a further aspect of this invention, a computer readable storage medium, comprising: a program encoded and stored in a computer readable format to cause a computer to execute a method for removing noise from an image signal comprising steps of: a separation step for separating the image signal into at least two subband signals; a parameter setting step for setting a plurality of coring ranges in relation to at least one of the subband signals; and a coring step for performing coring processing on the basis of the plurality of coring ranges.

An embodiment of this invention will be described in detail below together with the advantages of the invention with reference to the attached drawings.

DESCRIPTION OF THE PREFERRED EMBODIMENT

Figure 1:
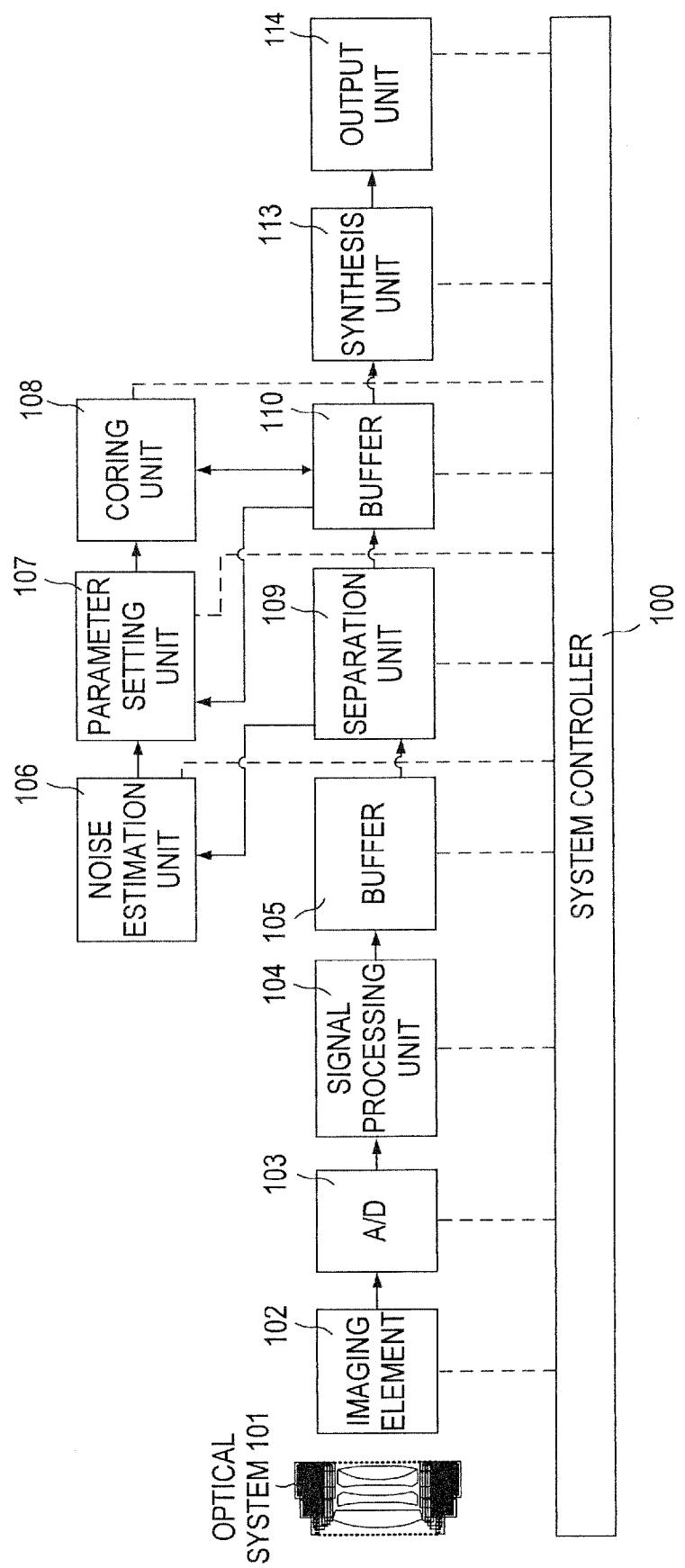
FIG. 1 is a system block diagram of an imaging device according to an embodiment of this invention.

FIG. 1 is a system block diagram of an imaging device according to an embodiment of this invention. The imaging device includes an optical system 101, an imaging element 102, an A/D conversion unit (A/D hereafter) 103, a signal processing unit 104, a buffer 105, a separation unit 109, a buffer 110, a noise estimation unit 106, a parameter setting unit 107, a coring unit 108, a synthesis unit 113, an output unit 114, and a system controller 100.

The imaging element 102 is connected to the signal processing unit 104 via the A/D 103. The signal processing unit 104 is connected to the buffer 105. The buffer 105 is connected to the separation unit 109. The separation unit 109 is connected to the noise estimation unit 106 and the buffer 110. The noise estimation unit 106 and the buffer 110 are connected to the parameter setting unit 107. The parameter setting unit 107 is connected to the coring unit 108. The buffer 110 is connected bi-directionally to the coring unit 108. The buffer 110 is connected to the output unit 114 via the synthesis unit 113.

Each processing unit is connected to the system controller 100, and operations thereof are controlled by the system controller 100. Solid lines denote data signal lines, and broken lines denote control signal lines.

On the basis of the control of the system controller 100, the imaging element 102 outputs an optical image formed on a surface of the imaging element 102 via the optical system 101 as an analog image signal. The analog image signal is transferred to the A/D 103.

The imaging element 102 is a color imaging element having a color filter array on a front surface thereof. The imaging element 102 may employ a single plate system (for example, single CCD) or a multi-plate system (for example, two or three CCD).

The A/D 103 converts the analog image signal into a digital signal and transfers the digital signal to the image processing unit 104.

The image processing unit 104 implements predetermined signal processing on the digital signal to generate a color three-plate image signal (a source image signal I hereafter) of a predetermined gradation.

The source image signal I is constituted by R, G, B color signals. These color signals will be referred to hereafter as Ir, Ig, Ib, respectively. The source image signal I is stored temporarily in the buffer 105, and then transferred to the separation unit 109.

On the basis of the control of the system controller 100, the separation unit 109 reads the source image signal I stored in the buffer 105, performs multiresolution transform in n predetermined stages (n being an integer of no less than 1) on the respective color signals Ir, Ig, Ib to generate a high frequency component and a low frequency component corresponding to a separation stage number i (i being an integer of no less than 1 and no more than n), and records these components in the buffer 110 and the noise estimation unit 106. Multiresolution transform will be described in detail below.

On the basis of the control of the system controller 100, the noise estimation unit 106 reads the high frequency component and the low frequency component from the separation unit 109, estimates a noise amount in each pixel of the high frequency component of each color signal using a preset noise amount model, and transfers the estimated noise amount to the parameter setting unit 107. Noise amount estimation will be described in detail below.

On the basis of the control of the system controller 100, the parameter setting unit 107 reads the noise amount from the noise estimation unit 106 and reads the high frequency component and low frequency component corresponding to the separation stage number i (i being an integer of no less than 1 and no more than n) from the buffer 110.

On the basis of the read noise amount, high frequency component, and low frequency component, the parameter setting unit 107 sets various parameters to be applied during coring processing in the coring unit 108, to be described below, and transmits these parameters to the coring unit 108.

In typical coring processing, when an input signal belongs to a coring range set by a lower limit threshold and an upper limit threshold, the signal value thereof is invariably set at zero, and when the input signal deviates from the coring range, it is set at a signal value reduced or increased by a threshold.

The aforementioned parameters are applied in the latter-stage coring unit 108 during coring processing on the high frequency components obtained by separating the color signals Ir, Ig, Ib, and are used to define a transform function for transforming a signal value input during the coring processing into a predetermined value.

Typically, a single coring range (i.e. a lower limit threshold and an upper limit threshold) is set within the transform function, but in this embodiment, the transform function is provided with a plurality of coring ranges (a group of a plurality of lower limit thresholds and upper limit thresholds as well as an output value corresponding to each coring range). Furthermore, parameter setting is not performed independently on each color signal, but in consideration of the correlativity between a coring processing subject color signal and the other color signals.

On the basis of the control of the system controller 100, the coring unit 108 reads the high frequency component corresponding to the separation stage number i from the buffer 110 and various parameters defining the transform function having the aforementioned plurality of coring ranges, which correspond to the respective high frequency components, from the parameter setting unit 107, and implements noise reduction processing by performing coring processing on the read high frequency component to transform a specific signal value into a fixed value.

The parameter setting method and the coring processing will be described below. The high frequency components reduced in noise by the coring unit 108 are transferred to the buffer 110 and overwritten onto the pre-correction high frequency components.

When noise reduction is completed on the high frequency components of all of the separation stages, the synthesis unit 113 reads the low frequency component and the correction-processed high frequency components from the buffer 110 on the basis of the control of the system controller 100, and synthesizes the corrected image signal by performing inverse multiresolution transform processing.

Inverse multiresolution transform processing will be described in detail below.

The synthesized image signal is transferred to the output unit 114. The output unit 114 performs well-known compression processing and the like on the synthesized image signal and then records and stores the image signal on a recording medium such as a memory card.

[Separation Unit]

Figure 2:
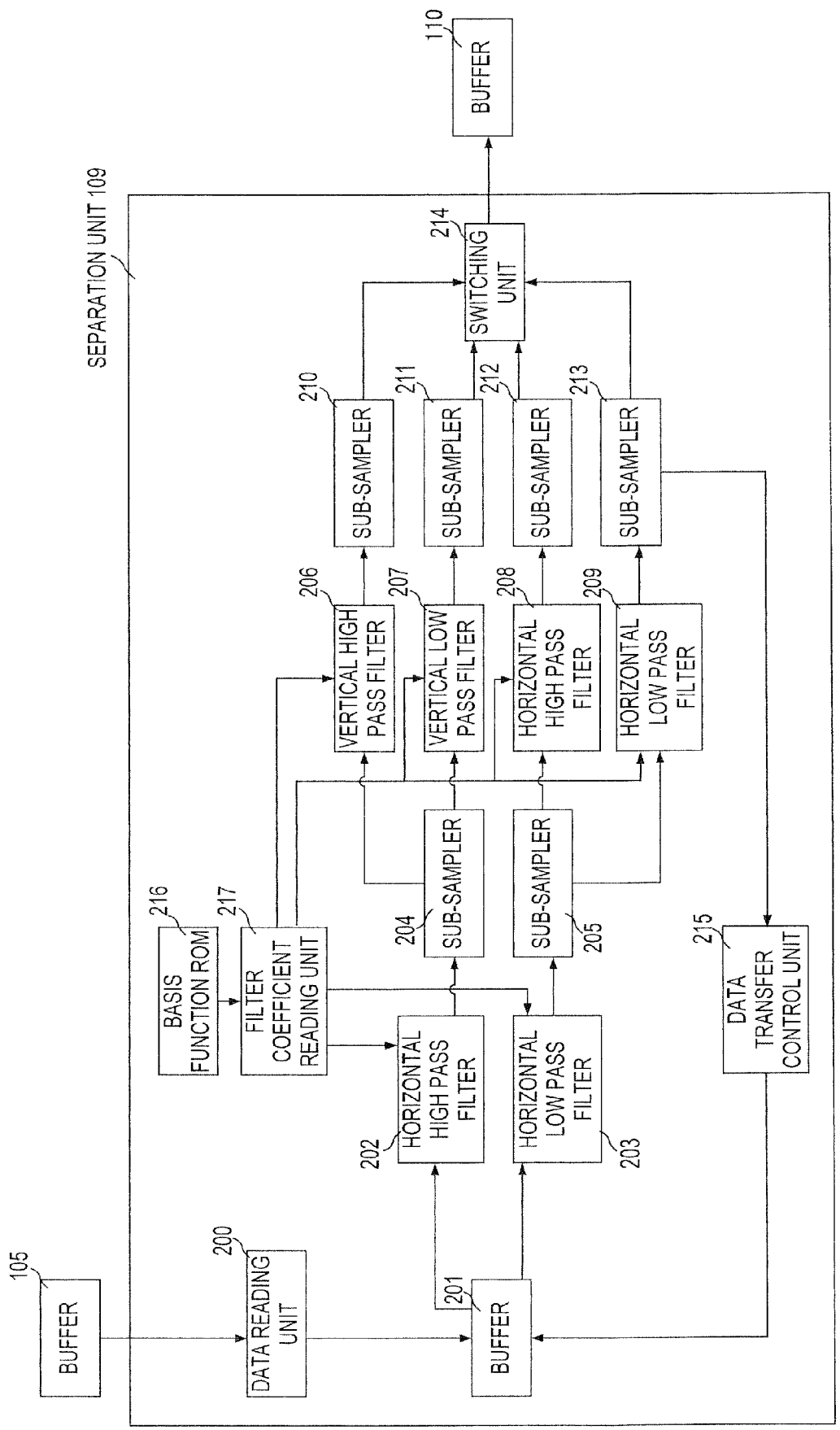
FIG. 2 is a block diagram of a separation unit.

Next, referring to FIG. 2, the constitution of the separation unit 109 will be described.

The separation unit 109 includes a data reading unit 200, a buffer 201, a horizontal high pass filter 202, a horizontal low pass filter 203, a sub-sampler 204, a sub-sampler 205, a vertical high pass filter 206, a vertical low pass filter 207, a vertical high pass filter 208, a vertical low pass filter 209, a sub-sampler 210, a sub-sampler 211, a sub-sampler 212, a sub-sampler 213, a switching unit 214, a data transfer control unit 215, basis function ROM 216, and a filter coefficient reading unit 217.

The buffer 105 is connected to the buffer 201 via the data reading unit 200. The buffer 201 is connected to the horizontal high pass filter 202 and the horizontal low pass filter 203. The horizontal high pass filter 202 is connected to the vertical high pass filter 206 and the vertical low pass filter 207 via the sub-sampler 204. The horizontal low pass filter 203 is connected to the vertical high pass filter 208 and the vertical low pass filter 209 via the sub-sampler 205. The vertical high pass filter 206, the vertical low pass filter 207, the vertical high pass filter 208, and the vertical low pass filter 209 are connected to the sub-sampler 210, the sub-sampler 211, the sub-sampler 212, and the sub-sampler 213, respectively. The sub-sampler 210, the sub-sampler 211, the sub-sampler 212, and the sub-sampler 213 are respectively connected to the switching unit 214. The sub-sampler 213 is also connected to the data transfer control unit 215. The switching unit 214 is connected to the buffer 110. The data transfer control unit 215 is connected to the buffer 201. The basis function ROM 216 is connected to the filter coefficient reading unit 217. The filter coefficient reading unit 217 is connected to the horizontal high pass filter 202, the horizontal low pass filter 203, the vertical high pass filter 206, the vertical low pass filter 207, the vertical high pass filter 208, and the vertical low pass filter 209.

Filter coefficients employed in a wavelet transform, such as a Haar function or a Daubechies function, are recorded in the basis function ROM 216. Of these filter coefficients, a high pass filter coefficient in the Haar function is illustrated in Equation (1), and a low pass filter coefficient is illustrated in Equation (2), for example.

$$\text{High pass filter coefficient} = \{0.5, -0.5\} \quad (1)$$

$$\text{Low pass filter coefficient} = \{0.5, 0.5\} \quad (2)$$

It should be noted that these filter coefficients are used in both the horizontal direction and the vertical direction.

The filter coefficient reading unit 217 reads the filter coefficients from the basis function ROM 216, and transfers the high pass filter coefficient to the horizontal high pass filter 202, vertical high pass filter 206, and vertical high pass filter 208, and the low pass filter coefficient to the horizontal low pass filter 203, vertical low pass filter 207, and vertical low pass filter 209.

After the filter coefficients have been transferred to the high pass filters and low pass filters in this manner, the data reading unit 200 reads the source image signal I from the buffer 105 and transfers it to the buffer 201.

The source image signal I in the buffer 201 is subjected to filtering processing in the horizontal and vertical directions by the horizontal high pass filter 202, horizontal low pass filter 203, vertical high pass filter 206, vertical low pass filter 207, vertical high pass filter 208, and vertical low pass filter 209.

Here, the sub-sampler 204 and the sub-sampler 205 sub-sample the input image signal at a sub-sampling ratio of ½ in the horizontal direction, while the sub-sampler 210, the sub-sampler 211, the sub-sampler 212, and the sub-sampler 213 sub-sample the input image signal at a sub-sampling ratio of ½ in the vertical direction.

Hence, the output of the sub-sampler 210 provides a high frequency component Hhv1 in both the horizontal and vertical directions, the output of the sub-sampler 211 provides a high frequency component Hh1 in the horizontal direction, the output of the sub-sampler 212 provides a high frequency component Hv1 in the vertical direction, and the output of the sub-sampler 213 provides a low frequency component LL1.

The switching unit 214 transfers the three high frequency components Hhv1, Hh1, Hv1 and the low frequency component LL1 to the buffer 110 in succession.

Further, the data transfer control unit 215 transfers the low frequency component LL1 from the sub-sampler 213 to the buffer 201.

Thus, the low frequency component LL1 stored in the buffer 201 is subjected to second stage separation by similar filtering processing to that described above, whereby three high frequency components Hhv2, Hh2, Hv2 and a low frequency component LL2 are output.

The process described above is controlled so as to be repeated until n predetermined stages of separation have been performed. When the n stages of separation are complete, high frequency components Hhvi, Hhi, Hvi and low frequency components LLi (i=1 to n) are stored in the buffer 110.

[Noise Estimation Unit]

Figure 3:
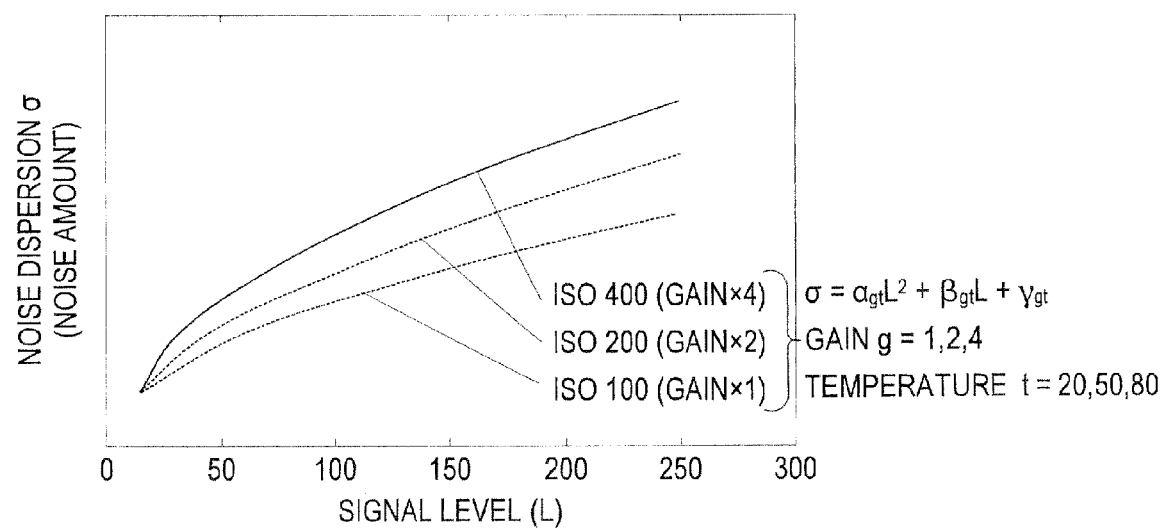
FIG. 3 is a view illustrating a noise model.

Next, referring to FIG. 3, the noise amount estimation method employed by the noise estimation unit 106 will be described.

A signal level—noise model (noise model hereafter) measured in advance on the basis of actual measurement is recorded in the noise estimation unit 106 in relation to the source image signal I, and by referring to the noise model, a noise amount a relative to a signal value of the source image signal I is estimated.

The noise model will now be described.

The noise amount σ increases in the manner of a quadratic curve relative to the signal level after conversion by the A/D 103. As disclosed in JP2005-175718A, when a signal level—noise dispersion model is expressed as a quadratic function, an Equation (3) is obtained.

$$\sigma = \alpha L_0^2 + \beta L_0 + \gamma \quad (3)$$

Here, $\alpha$, $\beta$, and $\gamma$ are constant items, and $L_0$ expresses the signal level after conversion by the A/D 103. However, the noise amount a varies not only in accordance with the signal level, but also in accordance with an element temperature and a gain. FIG. 3 shows an example in which the noise amount σ relative to three types of ISO sensitivity (gain) 100, 200 and 400, relating to the gain at a certain temperature t, is plotted.

The individual curves take the form indicated by Equation (3), but the corresponding coefficients differ according to ISO sensitivity (gain). When a noise model is formulated with the temperature as t, the gain as g, and taking the above into consideration, the noise model may be expressed by an Equation (4a).

$$\sigma = \alpha_{gt} L_0^2 + \beta_{gt} L_0 + \gamma_{gt} \quad (4a)$$

Here, $\alpha_{gt}$, $\beta_{gt}$, and $\gamma_{gt}$ are constant items determined according to the temperature t and the gain g. In the case of a color image signal, this noise model is applied independently to each color signal.

A noise model such as that shown in an Equation (4b) may be constructed similarly in relation to the respective high frequency components relating to the respective color signals separated by the wavelet transform.

$$\sigma = \alpha_{gt}(LL^i)^2 + \beta_{gt}(LL^i) + \gamma_{gt} \quad (4b)$$

Here, $LL^i$ expresses the signal value of the low frequency component of the separation stage i.

The noise amount σ is estimated in the noise estimation unit 106 on the basis of the signal value (typically, an average of the signal values in a peripheral area including the subject pixel) of each low frequency component of the respective color signals by referring to the noise model described above, and then transferred to the parameter setting unit 107. At the same time, a maximum value σmax (in FIG. 3, for example, a maximum value of the noise amount σ is obtained in the vicinity of L=250, and in this case 250 is set as σmax) of the noise amount σ, which is obtained from the subject noise model, is also transferred to the parameter setting unit 107.

[Parameter Setting]

Figure 4:
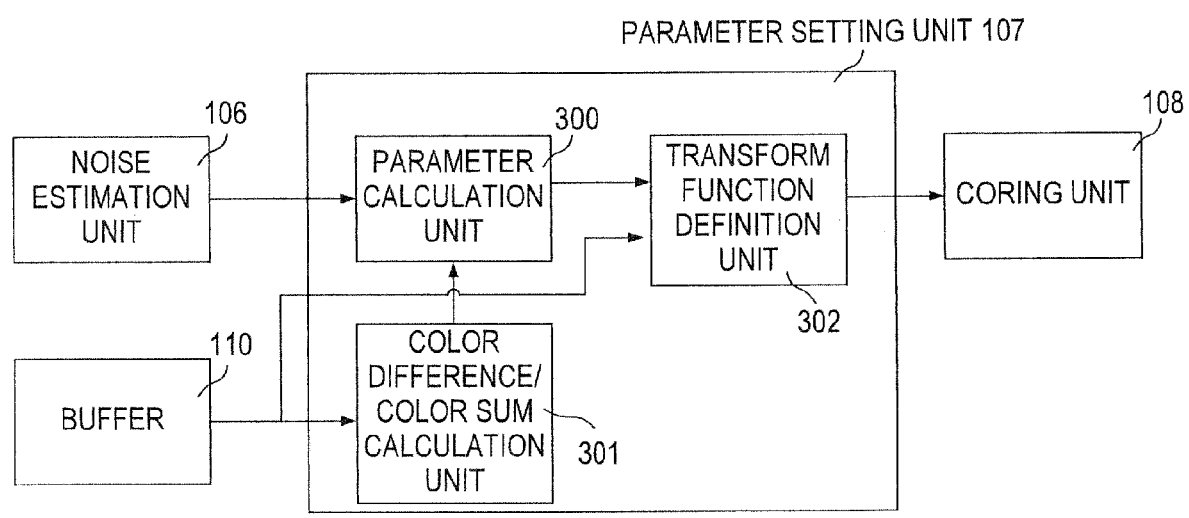
FIG. 4 is a block diagram of a parameter setting unit.

Next, referring to FIG. 4, an operation of the parameter setting unit 107 will be described in detail.

The parameter setting unit 107 includes a parameter calculation unit 300, a color difference/color sum calculation unit 301, and a transform function definition unit 302.

The buffer 110 is connected to the color difference/color sum calculation unit 301. The noise estimation unit 106 and the color difference/color sum calculation unit 301 are connected to the parameter calculation unit 300. The parameter calculation unit 300 is connected to the transform function definition unit 302. The transform function definition unit 302 is connected to the coring unit 108.

The parameter setting unit 107 obtains the noise amount and the maximum value of the noise amount from the noise estimation unit 106 and obtains the high frequency components relating to each color signal from the buffer 110. First, the parameter setting unit 107 sets parameters to be used in the coring processing on the basis of the noise amount, the noise amount maximum value, and the high frequency components. Coring processing is then performed on the high frequency components using the set parameters.

As an example, a case in which parameters are set in relation to the high frequency component of the color signal Ig will be described.

First, the color difference/color sum calculation unit 301 obtains high frequency components $Hr^i$, $Hg^i$, $Hb^i$ (i being the separation stage number) relating to the color signals Ir, Ig, Ib from the buffer 110. The color difference/color sum calculation unit 301 then extracts a signal value block of a rectangular area having a predetermined size (in the vicinity of 5×5 in this embodiment) centering on a subject pixel from $Hr^i$, $Hg^i$, $Hb^i$.

Next, using the signal values belonging to the extracted block, color differences Cr, Cb and color sums Ar, Ab defined in an Equation (5) are calculated.

$$Cr=\Sigma|Hg^i_k-Hr^i_k|/K, Cb=\Sigma|Hg^i_k-Hb^i_k|/K(k:0\sim K)$$

$$Ar=\Sigma|Hg^i_k+Hr^i_k|/K, Ab=\Sigma|Hg^i_k+Hb^i_k|/K(k:0\sim K) \quad (5)$$

Here, $Hr^i_k$, $Hg^i_k$, $Hb^i_k$ are the respective signal values of $Hr^i$, $Hg^i$, $Hb^i$ belonging to the above block, and K indicates the number of signal values. The calculated color differences Cr, Cb and color sums Ar, Ab are transferred to the parameter calculation unit 300.

During parameter calculation, the color differences Cr and Cb are compared, and the larger value is selected and set as C. On the basis of C, a coring position setting parameter $\alpha'$ is set to Fc (C) ($\alpha'$: 0 to 1).

Here, Fc ( ) is a predetermined function that normalizes an input value to a range of 0 to 1 on the basis of a maximum value Cmax of the color difference, which is determined and recorded in advance.

Similarly, the color sums Ar and Ab are compared, and the larger value is selected and set as A. On the basis of A, a coring position setting parameter $\beta'$ is set to Fa (A) ($\beta'$: 0 to 1).

Here, Fa ( ) is a predetermined function that normalizes an input value to a range of 0 to 1 on the basis of a maximum value Amax of the color sum, which is determined and recorded in advance.

Further, the parameter calculation unit 300 obtains the noise amount $\sigma$ and the noise amount maximum value $\sigma$max from the noise estimation unit 106. Then, on the basis of the noise amount $\sigma$ and the noise amount maximum value $\sigma$max, the parameter calculation unit 300 sets a parameter $\lambda$ for adjusting a coring width, which is defined by an Equation (6).

$$\lambda=\lambda c\times\sigma/\sigma\max \quad (6)$$

Here, $\lambda c$ is a predetermined constant. $\lambda$ is set to increase as the noise level increases.

The parameters $\alpha'$, $\beta'$, $\lambda$ calculated as described above are transferred to the transform function definition unit 302.

In the transform function definition unit 302, a transform function used in the coring is defined on the basis of the parameters $\alpha'$, $\beta'$, $\lambda$ and $Hr^i$, $Hg^i$, $Hb^i$.

When the signs of $Hr^i$ and $Hb^i$ match and $Hr^i>0$, $Hb^i>0$, and $Hr^i>Hb^i$, the transform function is defined by a polygonal function constituted by a plurality of sections $W^j$ (j=0 to 10), such as that shown in an Equation (7a), for example.

Here, $Tb^i$, $Tu^i$ express a lower limit value and an upper limit value of the section $W^j$, and $Hg^{itj}$ expresses an output value. $Tb^i$, $Tu^i$ and $Hg^{itj}$ are calculated on the basis of $\alpha'$, $\beta'$, $\lambda$ and $Hr^i$, $Hg^i$, $Hb^i$.

Here, sections having an output of a fixed value, such as sections $W^1$, $W^3$, $W^5$, $W^7$, are defined as coring range sections, and a plurality of coring range sections are set in the transform function.

The transform function is continuous, and the incline of the function in a non-coring range section is fixed at 1. Therefore, when the lower limit value, upper limit value, and output value of a coring range section are known, the output value of another non-coring range section can be calculated uniquely.

Further, a difference between the transform function in a non-coring range section and a direct function $Hg^{itj}=Hg^i$ takes a fixed value in the section, since the inclinations of these functions are 1.

In this embodiment, to define the transform function in the coring unit 108, the lower limit value, upper limit value, and output value relating to the coring range sections, the lower limit value and upper limit value in a non-coring range section, and the value of the difference between the transform function and the aforementioned direct function $Hg^{itj}=Hg^i$ in a non-coring range section are transferred to the coring unit 108.

Figure 5A:
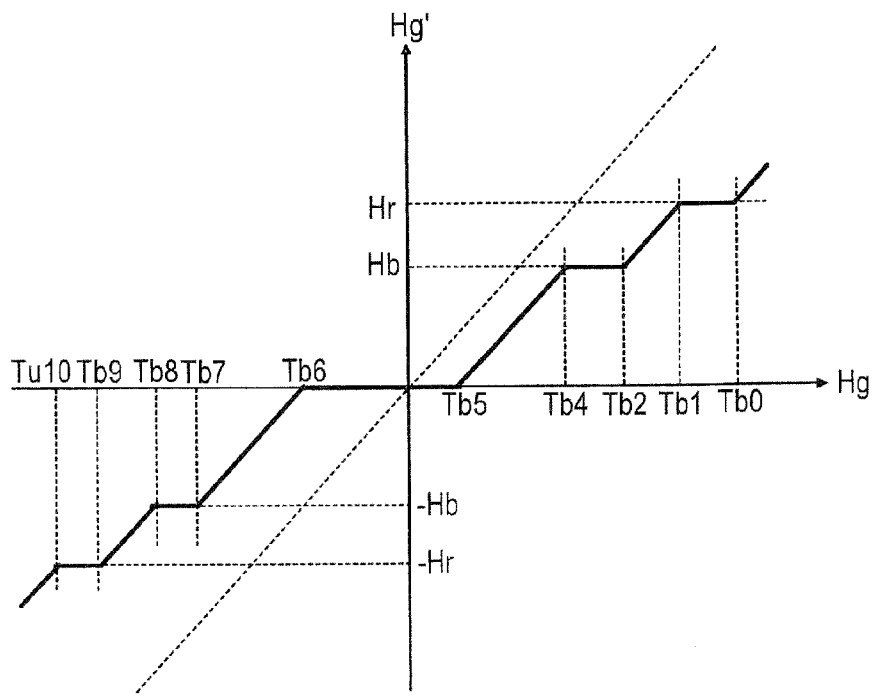
FIGS. 5A-5B are views showing a transform function during coring processing.

FIG. 5A shows the transform function defined by Equation (7a).

section $W^0$: $Tb^0>Hr^i+(1+2\alpha'+2\beta')/\lambda$ $\rightarrow Hg^{it0}=Hg^i-(1+2\alpha'+2\beta')/\lambda$ section $W^1$: $Tb^1=Hr^i+(1+2\beta')/\lambda, Tu^1=Hr^i+(1+2\alpha'+2\beta')/\lambda$ $\rightarrow Hg^{it1}=Hr^i$ section $W^2$: $Tb^2=Hb^i+(1+2\beta')/\lambda, Tu^2=Hr^i+(1+2\beta')/\lambda$ $\rightarrow Hg^{it2}=Hg^i-(1+2\beta')/\lambda$ section $W^3$: $Tb^3=Hb^i+(1+2\beta'-2\alpha')/\lambda, Tu^3=Hb^i+(1+2\beta')/\lambda$ $\rightarrow Hg^{it3}=Hb^i$ section $W^4$: $Tb^4=(1+2\beta'-2\alpha')/\lambda, Tu^4=Hb^i+(1+2\beta'-2\alpha')/\lambda$ $\rightarrow Hg^{it4}=Hg^i-(1+2\beta'-2\alpha')/\lambda$ section $W^5$: $Tb^5=-(1+2\alpha'-2\beta')/\lambda, Tu^5=(1+2\beta'-2\alpha')/\lambda$ $\rightarrow Hg^{it5}=0$ section $W^6$: $Tb^6=-Hb^i-(i+2\alpha'-2\beta')/\lambda, Tu^6=-(1+2\alpha'-2\beta')/\lambda$ $\rightarrow Hg^{it6}=Hg^i+(1+2\alpha'-2\beta')/\lambda$ section $W^7$: $Tb^7=-Hb^i-(1+2\alpha')/\lambda, Tu^7=-Hb^i-(1+2\alpha'-2\beta')/\lambda$ $\rightarrow Hg^{it7}=Hb^i$ section $W^8$: $Tb^8=-Hr^i-(1+2\alpha')/\lambda, Tu^8=-Hb^i-(1+2\alpha')/\lambda$ $\rightarrow Hg^{it8}=Hg^i+(1+2\alpha')/\lambda$ section $W^9$: $Tb^9=-Hr^j-(1+2\alpha'+2\beta')/\lambda, Tu^9=-Hr^j-(1+2\alpha')/\lambda$ $\rightarrow Hg^{it9}=-Hr^j$ section $W^{10}$: $Tu^{10}<-Hr^j-(1+2\alpha'+2\beta')/\lambda$ $\rightarrow Hg^{it10}=Hg^i+(1+2\alpha'+2\beta')/\lambda \quad (7a)$ Further, when $Hr^i>0$, $Hb^i>0$, and $Hr^i<Hb^i$, the coring range sections and the output values can be calculated by replacing $Hb^i$ with $Hr^i$ and replacing $Hr^i$ with $Hb^i$ in Equation (7a).

When $Hr^i<0$, $Hb^i<0$, and $|Hr^i|>|Hb^i|$, the coring range sections and the output values can be calculated by replacing $Hb^i$ with $-Hb^i$, $Hr^i$ with $-Hr^i$, $\alpha'$ with $\beta'$, and $\beta'$ with $\alpha'$ in Equation (7a).

When $Hr^i<0$, $Hb^i<0$, and $|Hr^i|<|Hb^i|$, the coring range sections and the output values can be calculated by replacing $Hb^i$ with $-Hr^i$, $Hr^i$ with $-Hb^i$, $\alpha'$ with $\beta'$, and $\beta'$ with $\alpha'$ in Equation (7a).

When the signs of $Hr^i$ and $Hb^i$ do not match and $Hr^i>0$, $Hb^i<0$, and $|Hr^i|>|Hb^i|$, the transform function is defined as shown in an Equation (7b), for example. As described above, the lower limit value, upper limit value, and output value relating to the coring range sections, the lower limit value and upper limit value in a non-coring range section, and the value of the difference between the transform function and the aforementioned direct function $Hg^{iv}=Hg^i$ in a non-coring range section are transferred to the coring unit 108.

Figure 5B:
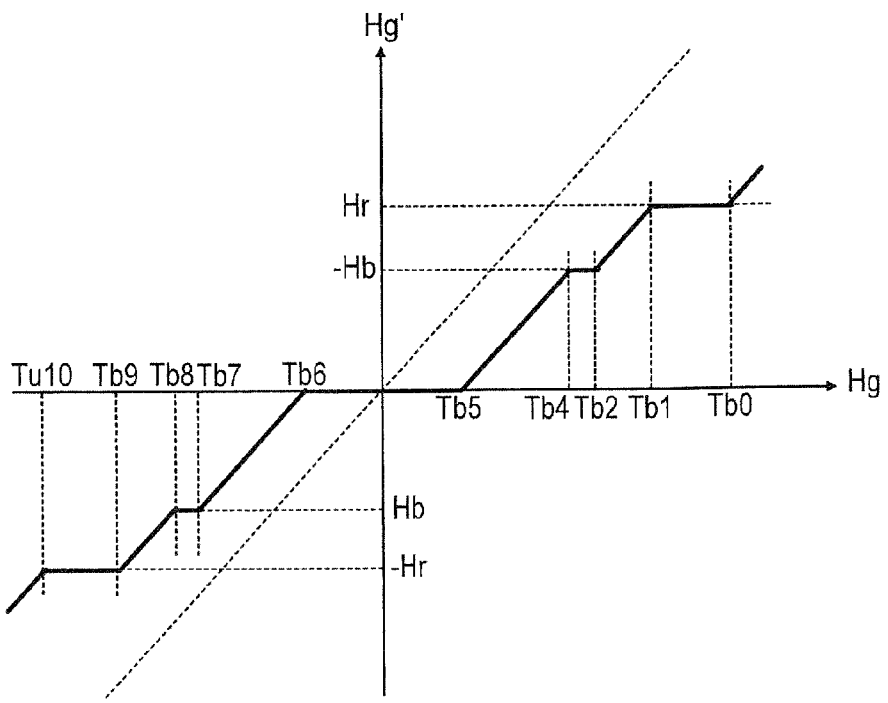

FIG. 5B shows the transform function defined by Equation (7b).

section $W^0$: $Tb^0 > Hr^i + (1+2\alpha'+2\beta')/\lambda$ $\rightarrow Hg^{i0} = Hg^i - (1+2\alpha'+2\beta')/\lambda$ section $W^1$: $Tb^1 = Hr^i + (1+2\beta')/\lambda, Tu^1 = Hr^i + (1+2\alpha' + 2\beta')/\lambda$ $\rightarrow Hg^{i1} = Hr^i$ section $W^2$: $Tb^2 = -Hb^i + (1+2\beta')/\lambda, Tu^2 = Hr^i + (1+2\beta')/\lambda$ $\rightarrow Hg^{i2} = Hg^i - (1+2\beta')/\lambda$ section $W^3$: $Tb^3 = -Hb^i + 1/\lambda, Tu^3 = -Hb^i + (1+2\beta')/\lambda$ $\rightarrow Hg^{i3} = -Hb^i$ section $W^4$: $Tb^4 = 1/\lambda, Tu^4 = -Hb^i + 1/\lambda$ $\rightarrow Hg^{i4} = Hg^i - 1/\lambda$ section $W^5$: $Tb^5 = -1/\lambda, Tu^5 = 1/\lambda$ $\rightarrow Hg^{i5} = 0$ section $W^6$: $Tb^6 = Hb^i - 1/\lambda, Tu^6 = -1/\lambda$ $\rightarrow Hg^{i6} = Hg^i + 1/\lambda$ section $W^7$: $Tb^7 = Hb^i - (1+2\alpha')/\lambda, Tu^7 = Hb^i - 1/\lambda$ $\rightarrow Hg^{i7} = Hb^i$ section $W^8$: $Tb^8 = -Hr^i - (1+2\alpha')/\lambda, Tu^8 = Hb^i - (1+2')/\lambda$ $\rightarrow Hg^{i8} = Hg^i + (1+2\alpha')/\lambda$ section $W^9$: $Tb^9 = -Hr^i - (1+2\alpha'+2\beta')/\lambda, Tu^9 = -Hr^i - (1+2\alpha')/\lambda$ $\rightarrow Hg^{i9} = -Hr^i$ section $W^{10}$: $Tu^{10} < -Hr^i - (1+2\alpha'+2\beta')/\lambda$ $\rightarrow Hg^{i10} = Hg^i + (1+2\alpha'+2\beta')/\lambda$ (7b)

Further, when $Hr^i > 0$, $Hb^i < 0$, and $|Hr^i| < |Hb^i|$, the coring range sections and the output values can be calculated by replacing $Hr^i$ with $-Hb^i$, $-Hb^i$ with $Hr^i$, $\alpha'$ with $\beta'$, and $\beta'$ with $\alpha'$ in Equation (7b).

When $Hr^i < 0$, $Hb^i > 0$, and $|Hr^i| > |Hb^i|$, the coring range sections and the output values can be calculated by replacing $-Hb^i$ with $Hb^i$, $Hr^i$ with $-Hr^i$, $\alpha'$ with $\beta'$, and $\beta'$ with $\alpha'$ in Equation (7b).

When $Hr^i < 0$, $Hb^i > 0$, and $|Hr^i| < |Hb^i|$, the coring range sections and the output values can be calculated by replacing $Hr^i$ with $Hb^i$ and replacing $-Hb^i$ with $-Hr^i$ in Equation (7b).

As regards other coring transform functions relating to $Hr^i$, $Hb^i$, a transform function relating to $Hr^i$ or $Hb^i$ can be calculated easily by interchanging $Hr^i$, $Hg^i$, $Hb^i$ in the transform function of $Hg^i$.

Further, in the processing described above, the transform function is constituted taking the color difference and color sum into account, but when only the color difference is taken into account, the transform function may be defined by calculating coring range sections and output values in which $\beta'$ is replaced with 0 in Equation (7a) and Equation (7b), and when only the color sum is taken into account, the transform function may be defined by calculating coring range sections and output values in which $\alpha'$ is replaced with 0 in Equation (7a) and Equation (7b).

As described above, a transform function having a plurality of coring ranges is calculated in relation to the high frequency components at all levels, and coring is performed on the basis thereof. Hence, in a section having a large signal value (a large amplitude), stronger smoothing is applied, and when a coring range is provided in a section where there is a high degree of similarity between the processing subject color signal value and the other color signal values, a signal value having strong similarity is forcibly replaced with another color signal value. Thus, smoothing that takes color correlativity into account is possible.

[Coring Unit]

Figure 6:
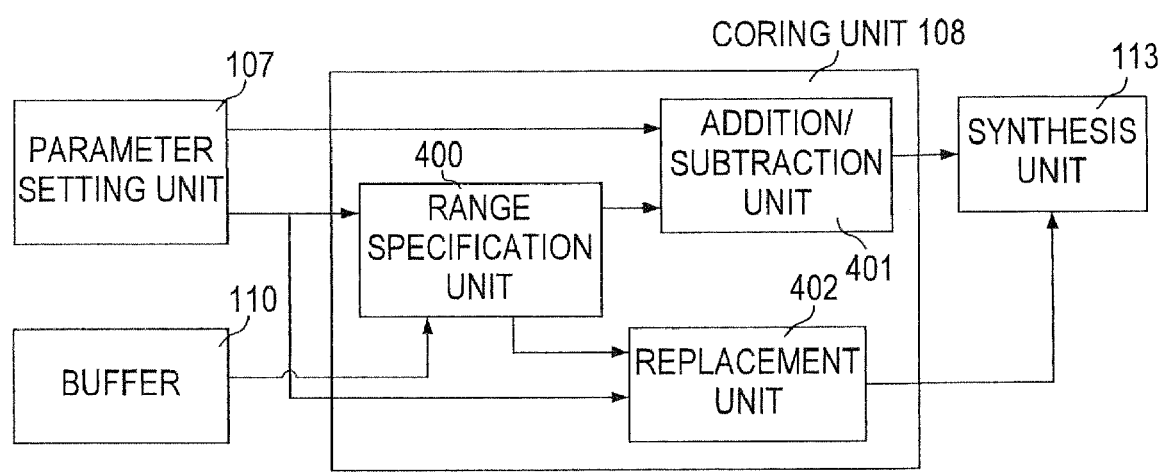
FIG. 6 is a block diagram of a coring unit.

Next, referring to FIG. 6, an operation of the coring unit 108 will be described in detail.

The coring unit 108 includes a range specification unit 400, an addition/subtraction unit 401, and a replacement unit 402.

The parameter setting unit 107 is connected to the range specification unit 400, the addition/subtraction unit 401, and the replacement unit 402.

The buffer 110 is connected to the range specification unit 400. The range specification unit 400 is connected to the addition/subtraction unit 401 and the replacement unit 402. The addition/subtraction unit 401 and the replacement unit 402 are connected to the synthesis unit 113.

First, the range specification unit 400 obtains the lower limit values and upper limit values relating to the coring range sections from the parameter setting unit 107. The range specification unit 400 also obtains the high frequency components of each color signal from the buffer 110 in succession. Here, the signal value of the high frequency component is compared with the lower limit value and upper limit value of a coring range section, and when the signal value belongs to the coring range section, the signal value of the high frequency component is transferred to the replacement unit 402. When the signal value does not belong to the coring range section, it is transferred to the addition/subtraction unit 401.

In the replacement unit 402, the output value corresponding to the coring range section to which the signal value of the high frequency component belongs is obtained from the parameter setting unit 107 and replaced by a signal value. The replaced signal value is transferred to the synthesis unit 113.

In the addition/subtraction unit 401, the value of the difference between the transform function and the aforementioned direct function $Hg^{iv}=Hg$ in the non-coring range section is obtained from the parameter setting unit 107 and added to the signal value of the high frequency component, whereupon the result is transferred to the synthesis unit 113.

[Synthesis Unit]

Figure 7:
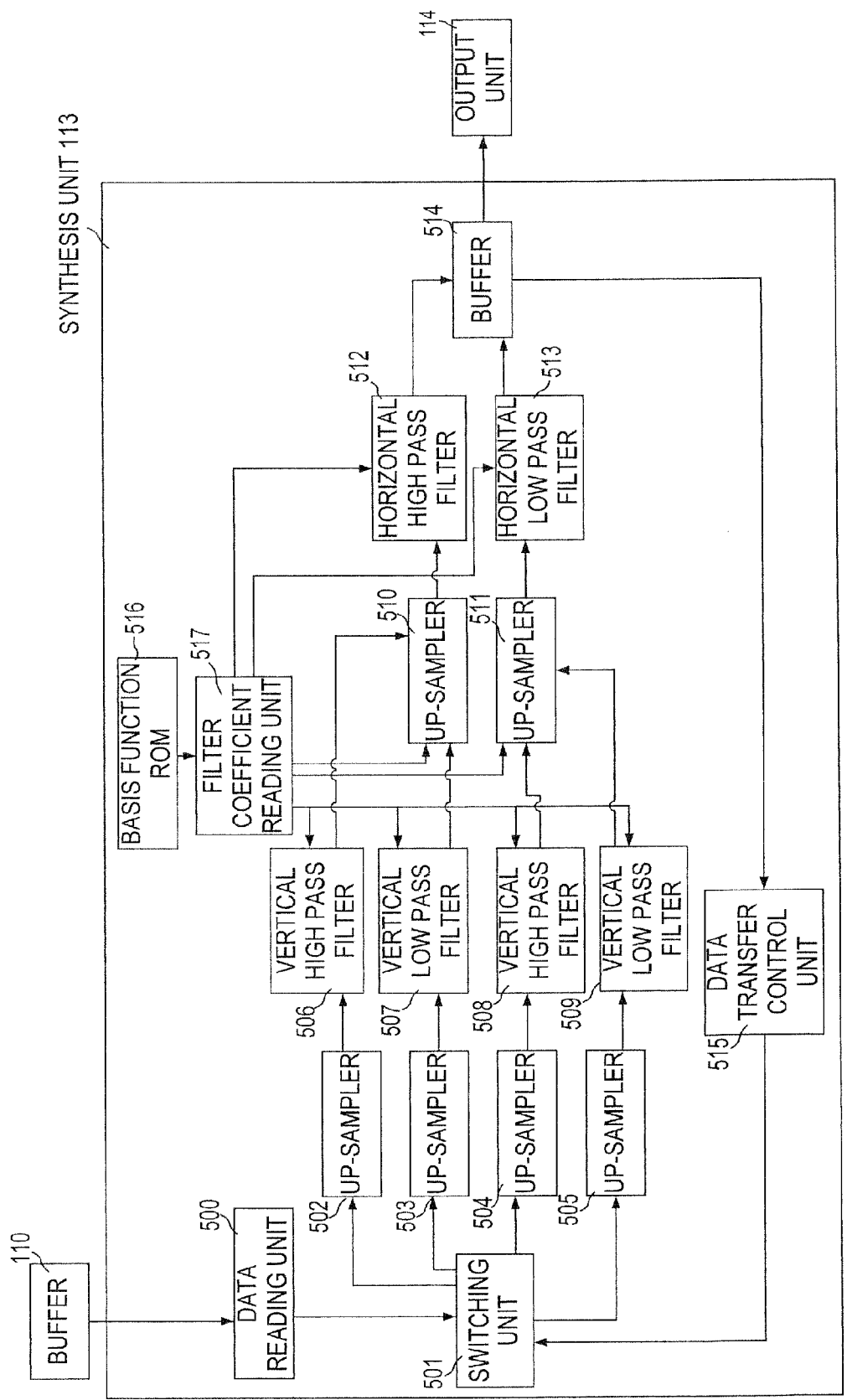
FIG. 7 is a block diagram of a synthesis unit.

Next, referring to FIG. 7, an action of the synthesis unit 113 will be described.

The synthesis unit 113 includes a data reading unit 500, a switching unit 501, an up-sampler 502, an up-sampler 503, an up-sampler 504, an up-sampler 505, a vertical high pass filter 506, a vertical low pass filter 507, a vertical high pass filter 508, a vertical low pass filter 509, an up-sampler 510, an up-sampler 511, a horizontal high pass filter 512, a horizontal high pass filter 513, a buffer 514, a data transfer control unit 515, basis function ROM 516, and a filter coefficient reading unit 517.

The buffer 110 is connected to the switching unit 501 via the data reading unit 500. The switching unit 501 is connected to the up-sampler 502, the up-sampler 503, the up-sampler 504, and the up-sampler 505. The up-sampler 502, the up-sampler 503, the up-sampler 504, and the up-sampler 505 are connected to the vertical high pass filter 506, the vertical low pass filter 507, the vertical high pass filter 508, and the vertical low pass filter 509, respectively. The vertical high pass filter 506 and the vertical low pass filter 507 are connected respectively to the up-sampler 510. The vertical high pass filter 508 and the vertical low pass filter 509 are connected respectively to the up-sampler 511. The up-sampler 510 and the up-sampler 511 are connected to the horizontal high pass filter 512 and the horizontal low pass filter 513, respectively. The horizontal high pass filter 512 and the horizontal low pass filter 513 are connected respectively to the buffer 514. The buffer 514 is connected to the output unit 114 and the data transfer control unit 515. The data transfer control unit 515 is connected to the switching unit 501. The basis function ROM 516 is connected to the filter coefficient reading unit 517. The filter coefficient reading unit 517 is connected to the vertical high pass filter 506, the vertical low pass filter 507, the vertical high pass filter 508, the vertical low pass filter 509, the horizontal high pass filter 512, and the horizontal low pass filter 513.

Filter coefficients employed in an inverse wavelet transform, such as a Haar function or a Daubechies function, are recorded in the basis function ROM 516.

The filter coefficient reading unit 517 reads the filter coefficients from the basis function ROM 516, and transfers the high pass filter coefficient to the vertical high pass filter 506, the vertical high pass filter 508, and the horizontal high pass filter 512, and the low pass filter coefficient to the vertical low pass filter 507, the vertical low pass filter 509, and the horizontal low pass filter 513.

After the filter coefficients have been transferred to the high pass filters and low pass filters in this manner, the data reading unit 500 reads the three coring-processed high frequency components Hhv" n, Hh" n, Hv" n and the low frequency component Ln from the buffer 110 and transfers them to the switching unit 501.

The switching unit 501 transfers the high frequency component Hhv" n to the vertical high pass filter 506 via the up-sampler 502, transfers the high frequency component Hh" n to the vertical low pass filter 507 via the up-sampler 503, transfers the high frequency component Hv" n to the vertical high pass filter 508 via the up-sampler 504, and transfers the low frequency component Ln to the vertical low pass filter 509 via the up-sampler 505, whereupon vertical direction filtering processing is executed.

Further, the frequency components from the vertical high pass filter 506 and vertical low pass filter 507 are transferred to the horizontal high pass filter 512 via the up-sampler 510, and the frequency components from the vertical high pass filter 508 and vertical low pass filter 509 are transferred to the horizontal low pass filter 513 via the up-sampler 511, whereupon horizontal direction filtering processing is executed. The frequency components from the horizontal high pass filter 512 and the horizontal low pass filter 513 are then transferred to the buffer 514 and synthesized into one, whereby a correction-processed low frequency component L" n−1 is generated.

Here, the up-sampler 502, the up-sampler 503, the up-sampler 504, and the up-sampler 505 up-sample an input frequency component at an up-sampling ratio of 2 in the vertical direction, while the up-sampler 510 and the up-sampler 511 up-sample an input frequency component at an up-sampling ratio of 2 in the horizontal direction.

The data transfer control unit 515 reads the low frequency component L" n−1 from the buffer 514 and transfers the read low frequency component L" n−1 to the switching unit 501.

Further, the data reading unit 500 reads the three correction-processed high frequency components Hhv" n−1, Hh" n−1, Hv" n−1 from the buffer 110 and transfers them to the switching unit 501.

Similar filtering processing to that described above is then performed on the frequency components of the separation stage number n−1, whereupon a low frequency component L" n−2 is output to the buffer 514. This process is repeated until n predetermined synthesis stages have been performed. Thus, finally, a correction-processed low frequency component L" 0 is output to the buffer 514. The buffer 514 transfers the low frequency component L" 0 to the output unit 114.

[Software Processing]

It is assumed that the processing described above is executed using hardware, but this invention is not limited to this constitution. For example, a source image signal from the imaging element 102 may be recorded as unprocessed raw data on a recording medium such as a memory card, and additional information such as imaging conditions (for example, imaging conditions such as the ISO sensitivity and so on) may be recorded on the recording medium as header information. Then, by causing a computer to execute an image processing program provided as separate software, the information on the recording medium can be read and processed by the computer.

It should be noted that transfer of the information from the imaging unit to the computer is not limited to transfer via a recording medium, and may be performed via a communication line or the like.

Figure 8:
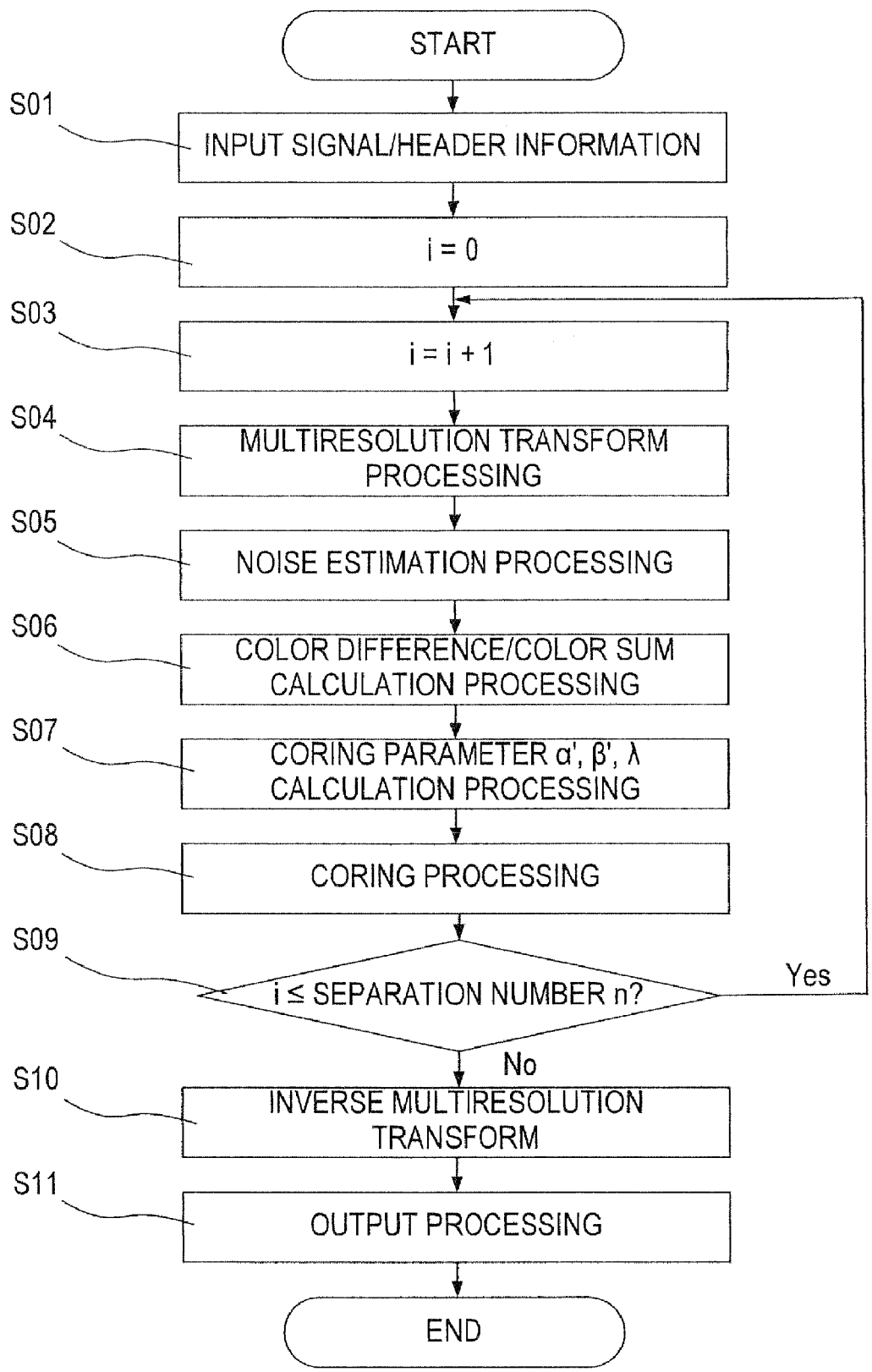
FIG. 8 is a flowchart of a main routine of an image processing program executed by a computer.

Referring to FIG. 8, a main routine of the processing performed by the image processing program will be described.

At the start of the processing, an image signal is read together with header information such as the temperature and exposure information of the imaging element 102 and image processing information (step S01).

Next, a variable i indicating the separation stage number is initialized to 0 (step S02).

Next, the separation stage number i is increased by 1 (step S03).

Next, resolution separation corresponding to the separation stage number i is performed on each color signal constituting the source image signal to obtain a high frequency component and a low frequency component (step S04).

Next, a noise amount is estimated on the basis of a noise model (step S05).

Next, color differences and color sums are calculated on the basis of the high frequency components of each color component (step S06).

Next, $\lambda$ is calculated from the noise amount estimated in S05, and $\alpha'$, $\beta'$ are calculated from the color differences and color sums calculated in S06 (step S07).

Next, coring processing is performed on the basis of a transform function defined by $\lambda$, $\alpha'$, $\beta'$, calculated in S07, in relation to the high frequency component of the separation stage number i (step S08).

Next, a determination is made as to whether or not the separation stage number i is equal to or lower than a defined n (step S09). If so, the routine returns to the step S03 and repeats the processing described above in relation to the next separation stage. When the separation stage number i is determined to exceed the defined n, a low frequency component is output (step S09).

Then, n-stage inverse multiresolution transform is performed using the correction-processed high frequency components and low frequency components to generate a corrected image signal (step S10).

Finally, well-known compression processing and the like are performed, whereupon the processed image signal is output (step S11). The series of processes is then terminated.

An embodiment of this invention was described above, but the embodiment described above is merely one example of application of the invention, and the technical scope of the invention is not limited to the specific constitution of the embodiment.

This application claims priority based on JP2007-225840A, filed with the Japan Patent Office on Aug. 31, 2007, the entire content of which is incorporated into this specification by reference.

What is claimed is:

1. A noise removal device that removes noise from an image signal, comprising:
    a separation unit that separates the image signal into at least two subband signals;
    a noise estimation unit that estimates a noise amount of a pixel of at least one of the subband signals;
    a parameter setting unit that sets a plurality of coring ranges in relation to at least one of the subband signals, the coring ranges being ranges of signal values of subband signals to be subjected to coring processing within the subband signals; and
    a coring unit that performs the coring processing on the at least one of the subband signals based on the plurality of coring ranges;
    wherein the parameter setting unit includes a color difference/color sum calculation unit that calculates at least one of a color difference and a color sum using signal values in a region within the at least one of the subband signals;
    wherein the parameter setting unit adjusts the plurality of coring ranges based on the noise amount and the at least one of the color difference and the color sum;
    wherein the parameter setting unit sets a first fixed output value for a first coring range in the plurality of coring ranges in relation to the at least one of the subband signals, and sets a second fixed output value for a second coring range in the plurality of coring ranges in relation to the at least one of the subband signals; and
    wherein the coring unit:
        transforms signal values belonging to the first coring range within the at least one of the subband signals into the first fixed output value,
        transforms signal values belonging to the second coring range within the at least one of the subband signals into the second fixed output value, and
        corrects signal values that do not belong to any one of the plurality of coring ranges in relation to the at least one of the subband signals.

2. The noise removal device as defined in claim 1, wherein the image signal is comprised of a plurality of color components, and operations of the separation unit, the parameter setting unit, and the coring unit are applied to each of the plurality of color components.

3. The noise removal device as defined in claim 2, wherein the parameter setting unit sets the plurality of coring ranges based on a calculation value of a signal value of the plurality of color components.

4. The noise removal device as defined in claim 1, wherein the separation unit employs a wavelet transform.

5. The noise removal device as defined in claim 1, further comprising a synthesis unit that synthesizes the plurality of subband signals following the coring processing.

6. A noise removal method for removing noise from an image signal, the method comprising:
    separating the image signal into at least two subband signals;
    estimating a noise amount of a pixel of at least one of the subband signals;
    setting a plurality of coring ranges in relation to at least one of the subband signals, the coring ranges being ranges of signal values of subband signals to be subjected to coring processing within the subband signals; and
    performing the coring processing on the at least one of the subband signals based on the plurality of coring ranges;
    wherein the setting comprises:
        calculating at least one of a color difference and a color sum using signal values in a region within the at least one of the subband signals;
        adjusting the plurality of coring ranges based on the noise amount and the at least one of the color difference and the color sum; and
        setting (i) a first fixed output value for a first coring range in the plurality of coring ranges in relation to the at least one of the subband signals, and (ii) a second fixed output value for a second coring range in the plurality of coring ranges in relation to the at least one of the subband signals; and
    wherein the coring comprises:
        transforming signal values belonging to the first coring range within the at least one of the subband signals into the first fixed output value,
        transforming signal values belonging to the second coring range within the at least one of the subband signals into the second fixed output value, and
        correcting signal values that do not belong to any one of the plurality of coring ranges in relation to the at least one of the subband signals.

7. The noise removal method as defined in claim 6, wherein the image signal is comprised of a plurality of color components, and the separating, the setting, and the coring are applied to each of the plurality of color components.

8. The noise removal method as defined in claim 7, wherein the setting comprises setting the plurality of coring ranges based on a calculation value of a signal value of the plurality of color components.

9. The noise removal method as defined in claim 6, wherein the separating employs a wavelet transform.

10. The noise removal method as defined in claim 6, further comprising synthesizing the plurality of subband signals after the coring is performed.

11. A non-transitory computer readable storage medium having a program stored thereon, the program causing a computer to execute a method for removing noise from an image signal, the method comprising:
    separating the image signal into at least two subband signals;
    estimating a noise amount of a pixel of at least one of the subband signals;
    setting a plurality of coring ranges in relation to at least one of the subband signals, the coring ranges being ranges of signal values of subband signals to be subjected to coring processing within the subband signals; and
    performing the coring processing on the at least one of the subband signals based on the plurality of coring ranges;
    wherein the setting comprises:
        calculating at least one of a color difference and a color sum using signal values in a region within the at least one of the subband signals;
        adjusting the plurality of coring ranges based on the noise amount and the at least one of the color difference and the color sum; and setting (i) a first fixed output value for a first coring range in the plurality of coring ranges in relation to the at least one of the subband signals, and (ii) a second fixed output value for a second coring range in the plurality of coring ranges in relation to the at least one of the subband signals; and wherein the coring comprises:

transforming signal values belonging to the first coring range within the at least one of the subband signals into the first fixed output value, transforming signal values belonging to the second coring range within the at least one of the subband signals into the second fixed output value, and correcting signal values that do not belong to any one of the plurality of coring ranges in relation to the at least one of the subband signals.

* * * * *